(12) United States Patent
Romzek (10) Patent No.: US 8,651,909 B2
(45) Date of Patent: Feb. 18, 2014

(54) SEGMENTED RECREATIONAL DEVICE

(76) Inventor: Patrick J. Romzek, Dearborn, MI (US)

( * ) Notice: Subject to any disclaimer, the term of this patent is extended or adjusted under 35 U.S.C. 154(b) by 111 days.

(21) Appl. No.: 13/432,839

(22) Filed: Mar. 28, 2012

(65) Prior Publication Data

US 2012/0252293 A1 Oct. 4, 2012

Related U.S. Application Data

(60) Provisional application No. 61/468,192, filed on Mar. 28, 2011.

(51) Int. Cl.
*B63C 9/08* (2006.01)

(52) U.S. Cl.
USPC .................. 441/129; 114/219; 114/230.2

(58) Field of Classification Search
USPC .......... 441/129, 130, 131, 132, 133; 114/219, 114/220, 230.2
See application file for complete search history.

(56) References Cited

U.S. PATENT DOCUMENTS

| | | | |
|---|---|---|---|
| 1,960,474 A | | 5/1934 | Browne |
| 2,197,324 A | | 4/1940 | Sommers et al. |
| 2,859,458 A | | 11/1958 | Calarco |
| 3,757,370 A | * | 9/1973 | Seno et al. ............ 441/133 |
| 3,822,499 A | | 7/1974 | De Vos |
| 4,188,679 A | | 2/1980 | Hollaender et al. |
| 4,804,177 A | | 2/1989 | Rosson |
| 4,861,300 A | | 8/1989 | Casagrande et al. |
| 4,875,427 A | * | 10/1989 | Harris, Jr. ............ 114/219 |
| 4,997,375 A | | 3/1991 | Heinz |
| 5,302,148 A | | 4/1994 | Heinz |
| 5,441,006 A | * | 8/1995 | Wood ............ 114/220 |
| 5,483,914 A | | 1/1996 | Wonka et al. |
| 5,498,190 A | | 3/1996 | Ganson |
| 5,520,561 A | | 5/1996 | Langenohl |
| 5,562,514 A | | 10/1996 | Rowe |
| 5,571,036 A | | 11/1996 | Hannigan |
| D388,489 S | | 12/1997 | Sikorski |
| D388,492 S | | 12/1997 | Sikorski |
| 5,885,123 A | | 3/1999 | Clifford |
| 5,897,409 A | | 4/1999 | Hartman et al. |
| 5,916,006 A | | 6/1999 | Ganson |
| 5,947,782 A | | 9/1999 | Siladke et al. |
| D416,302 S | | 11/1999 | Sherwood |
| D417,714 S | | 12/1999 | Yeung |
| 6,056,613 A | | 5/2000 | Pike |
| D430,636 S | | 9/2000 | Afshari |
| 6,171,160 B1 | | 1/2001 | Skaggs et al. |
| 6,276,979 B1 | | 8/2001 | Saltel et al. |
| 6,482,058 B2 | | 11/2002 | Sanso et al. |
| 6,482,063 B1 | | 11/2002 | Frigard |
| 6,790,112 B2 | | 9/2004 | Kirk |
| 6,837,765 B2 | | 1/2005 | Lauziere |

(Continued)

*Primary Examiner* — Lars A Olson
(74) *Attorney, Agent, or Firm* — Harness, Dickey & Pierce, P.L.C.

(57) ABSTRACT

A segmented flotation device available in a plurality of colors, sizes, and configurations is disclosed. Each flotation device includes one or more buoyant members strung together with an elastic band. A recessed cup at each end of the device stores a coupler which is in turn secured to the elastic band. The coupler is configured with couplers for interconnecting flotation devices to create a variety of shapes and structures such as grids, float mats, and long float lines. A cord lock may be provided on the elastic band for adjusting the preloaded tension. A plurality of flotation devices can be packaged with other accessories connectable to the devices for creating a seat, mat, island or other structure, for holding beverages, or for providing awning structure.

21 Claims, 7 Drawing Sheets

(56) References Cited

U.S. PATENT DOCUMENTS

| | | |
|---|---|---|
| 7,040,949 B2 | 5/2006 | Slocum |
| 7,153,247 B1 | 12/2006 | Filkoff |
| D537,142 S | 2/2007 | Eagan |
| 7,322,868 B2 | 1/2008 | Ross |
| 7,594,477 B2 | 9/2009 | Arias et al. |
| D605,245 S | 12/2009 | Loudon |
| 8,137,031 B2 * | 3/2012 | Meyers et al. ............ 405/215 |
| 2009/0156086 A1 | 6/2009 | Hartings |

* cited by examiner

SEGMENTED RECREATIONAL DEVICE

CROSS-REFERENCE TO RELATED APPLICATIONS

This application claims the benefit of U.S. Provisional Application No. 61/468,192, filed on Mar. 28, 2011. The entire disclosure of the above application is incorporated herein by reference.

FIELD

The present disclosure relates to a recreational device with a plurality of foam members that can be interconnected to create a variety of shapes and structures for recreational, exercise, or rehabilitation purposes including for use as a floatation device.

BACKGROUND

This section provides background information related to the present disclosure which is not necessarily prior art.

Numerous prior art recreational devices are designed to float in the water and are utilized for other recreation or exercise purposes. However, these designs are limited in that they either have one pre-defined shape, there is a single device that cannot be connected to other devices, or there is a plurality of flotation members for the device but they are identical in shape and have little to no connectivity.

Accordingly, there is a need in the art to provide configurable segmented recreational devices and a kit with a variety of members that can easily be connected with other members for construction of a variety of shapes and structures.

SUMMARY

This section provides a general summary of the disclosure, and is not a comprehensive disclosure of its full scope or all of its features.

As further set forth in detail below, this disclosure provides a segmented recreational device with foam members available in a plurality of colors, sizes, and configurations that can be interconnected to create a variety of shapes and structures. Each foam member adapted for making an interlocking connection with another foam member to form structures such as grids, float mats, and long float lines. The foam members can be used to make custom flotation designs and other recreational, exercise or rehabilitation apparatuses. Accessories may also be interconnected with members to form seats, mats, islands, beverage holder, and shade screen.

The segmented recreational device contains a variety of members e.g., a spherical member, a 10-inch segmented member, a 10-inch member, a 50-inch segmented member, and a 60-inch member. Each of these members come in a plurality of diameters and sizes and can be customized in a variety of color combinations and configurations. Elastic bands with couplers on each end extend through the center of the members to hold the members together and provide a means for attachment with other members. The couplers are supported by plastic cups that are recessed in the ends of the members so that the coupler is subjacent to the end of the member. This prevents the coupler from snagging or catching on objects. These cups retain the couplers and preload the elastic bands in tension to support the structure of the member. The couplers can be connected to couplers or elastic bands of other members to form customized structures. A cord lock adjuster tightens and releases the elastic bands to adjust the tension in the elastic bands and create flexible and rigid members. The variety of members and accessories available allow the segmented recreational device to be sold as a kit to add variety to the consumer experience.

These devices can be used in an aquatic environment as personal flotation, swimming aids, water exercise aids, or physical therapy aids. These devices are not intended to be used as a life-saving device or substitute for US Coast Guard approved personal floatation device. These devices can provide an enhanced swimming experience. Likewise, these devices can be used as dock bumpers, swim ring, senior exercise floats, beach rentals, water hammocks, boat bumpers, padded straps, swim markers, floats for tackle boxes and coolers, and pool noodles. Furthermore, these devices can be used more generally as configurable decoration or pliable building blocks which can be assembled in unlimited ways similar to conventional building block. For example, the devices may be interconnected to make arches, tunnels, tents, letters, numbers, figurines, goals, hoops, playscapes, etc.

Further areas of applicability for these segmented recreational devices will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The following description is merely exemplary in nature and is not intended to limit the present disclosure, application, or uses.

Example embodiments are provided to more thoroughly describe and fully convey the scope of the subject matter to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

With reference now to the features, a segmented recreational device is illustrated. The segmented recreational device may take the form of a spherical-shaped member 10, a non-segmented tubular-shaped member 14, a sectioned tubular-shaped member 18, or a sectioned combination member 22, wherein the sectioned tubular-shaped members 18, 22 are flexible members and the non-segmented tubular-shaped member 14 is a firm member. The term tubular-shaped member refers to an elongated member. As presently illustrated, the tubular-shaped members are generally cylindrical with a circular cross-section. The tubular-shaped members could, however, be configured in any elongated configuration having various cross-sections including elliptical, square, rectangular, and triangular as examples. Likewise, the tubular-shaped members are generally illustrated as having a central longitudinal passage formed therethrough. The longitudinal passage may, however, be configured in various ways for receiving the elastic bands as hereinafter described. In their preferred form, the members are made from closed cell polyethylene foam which is buoyant in water. However, one skilled in the art will recognize that other materials may be used in the fabrication of the members.

Figure 1A:
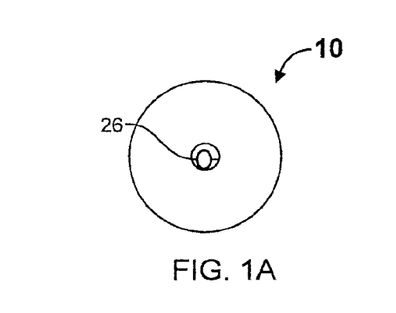
FIGS. 1A-1D are perspective views of a spherical member, a member, a segmented member, and a combination segmented member.

With particular reference to FIG. 1A, a spherical-shaped member 10 is illustrated including a plurality of couplers 26. The spherical-shaped member 10 may function as a node or nodal member for interconnecting adjacent tubular-shaped members as illustrated in FIG. 1D. The couplers 26 may be clips, hooks, loops or any other attachment means. The spherical-shaped member 10 may have a diameter within a range of approximately 2.5 inches to 5 inches.

Figure 1B:
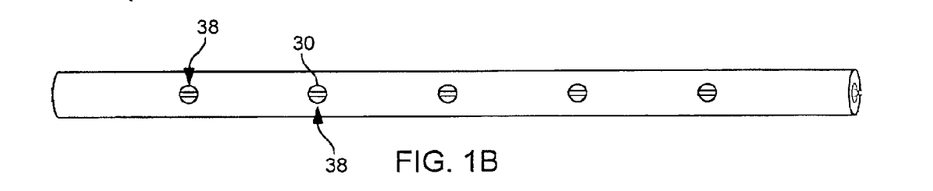

With particular reference to FIG. 1B, the embodiment includes a non-segmented tubular-shaped member 14 is approximately 10 inches in length, but may vary in length. The non-segmented tubular-shaped member 14 includes a plurality of elastic bands 30 with a plurality of couplers 34. The plurality of elastic bands 30 are moveably supported in, and in sliding contact with, the non-segmented tubular-shaped member 14. Each of the flexible elastic bands 30 have a first end and a second end extending in opposite directions and are longitudinally stretchable. A range of 2 to 4 elastic bands are supported in the non-segmented tubular-shaped member 14. In their preferred form, the elastic bands 30 include one or more elastic strands and may be covered in a woven cotton or polyethylene sheath. The elastic cord is also commonly referred to as a bungee or bungie cord or shock cord. The tubular-shaped member 14 also includes a plurality of through-bores 38, perpendicular to the flexible elastic bands 30, traversing through the midsection of the tubular-shaped member 14 and allowing access to the elastic bands 30 extending through the tubular-shaped member 14. The bores 38 are located every five inches along the length of the tubular-shaped member 14, but may be located at varying distances to suit the application. Ends 40 of the tubular-shaped member 14 include the plurality of couplers 34 slideably connected to the elastic bands 30.

Figure 1C:
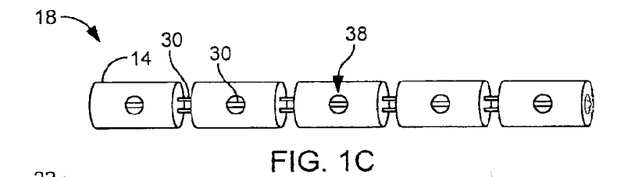
Figure 1D:
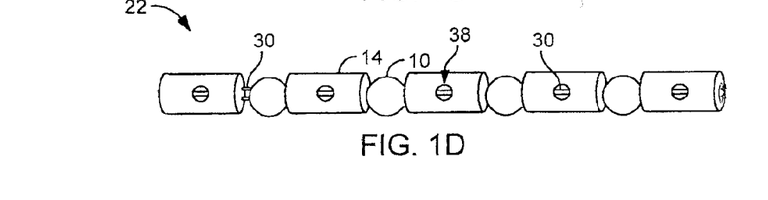
Figure 2:
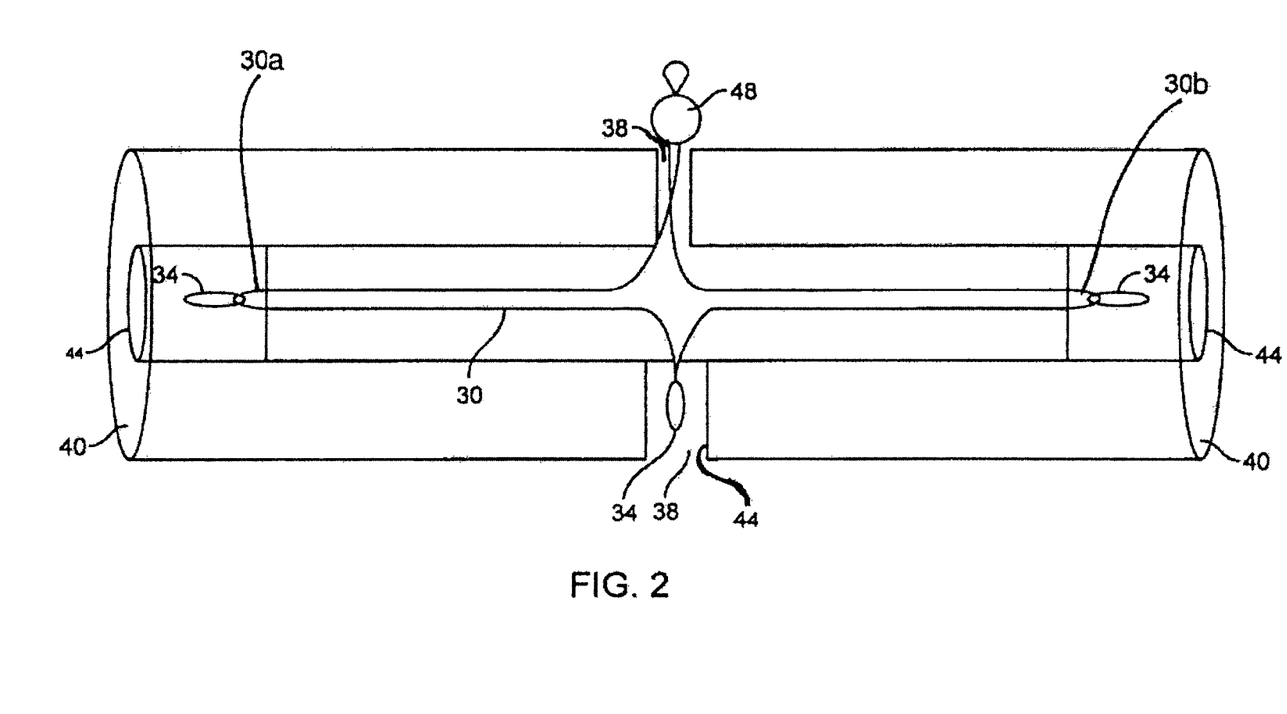
FIG. 2 is a perspective view of elastic bands, a cord lock adjuster, and a plurality of couplers in ports.

With reference to FIG. 1C, the sectioned tubular-shaped member 18 is illustrated including a plurality of tubular-shaped members 14 and the plurality of elastic bands 30 with the plurality of couplers 34. Each tubular-shaped member 14 is preferably 10 inches in length, but may be longer or shorter for specific applications. The tubular-shaped member 18 includes the plurality of elastic bands 30 that are moveably supported in and in sliding contact with the tubular-shaped member 18. Each of the flexible elastic bands 30 have a first end and a second end extending in opposite directions and are longitudinally stretchable. A range of 2 to 4 elastic bands are used to hold the tubular-shaped members 14 together and keep the shape of the segmented floatation device. The term "end" as used in reference to the elastic band is not intended to refer to a terminus or free end of the elastic band, but instead to that portion of the elastic band that may protrude from the end of a tubular member. For example, as illustrated in FIG. 2, the elastic band 30 is a loop having end loops 30a, 30b that may be pulled out of the end 40 of member 14. The bore 38, perpendicular to the flexible elastic bands 30, traverses through the midsection of the tubular-shaped member 14 and allows access to the elastic bands 30 extending through the tubular-shaped member 14. The tubular-shaped members 14 are positioned end-to-end with the elastic bands 30 extending therethrough to form the sectioned tubular-shaped member 18. The free end 40 of the segmented floatation device 18 includes the coupler 34 slideably connected to the elastic bands 30. The embodiment illustrated in FIG. 1C consists of 5 tubular-shaped members 14 for a total of 50 inches in length.

Different length devices 18 may be constructed by varying the length and/or number of tubular-shaped members 14. For example, an embodiment may include 2 tubular-shaped members 14 that are 5 inches in length each, for a total of 10 inches in length. The two-member device may be connected on a common set of elastic bands 30. Alternatively, the length of the device could be adjusted by interconnecting individual members with separate elastic bands 30 in an end to end manner. In one embodiment couplers 34 at the end 40 of each member 14 would be interconnected to yield a flexible device. In another embodiment each member 14 includes an interlock (not shown) for coupling the abutting ends of members to yield a more rigid device. For example, one or more spherical 10 or cylindrical 14, 18, 22 elements may extend from the end of one member and be received within a complementary socket or blind bore formed in the adjacent member. In this way a structural interlock is established between the pair of members and provide a stiffer device.

With reference to FIG. 1D, the combination sectioned tubular-shaped member 22 is illustrated including the plurality of tubular-shaped members 14, the plurality of spherical-shaped members 10, and the plurality of elastic bands 30 with the plurality of couplers 34. Each tubular-shaped member 14 is 10 inches in length and constructed of a buoyant foam material. Each spherical-shaped member 10 is 2.5 inches in diameter and constructed of a buoyant material. The size and material may vary depending on the application. The tubular-shaped member 22 includes a plurality of elastic bands 30 that are moveably supported in and in sliding contact with the tubular-shaped member 22, wherein each of the flexible elastic bands 30 have a first end and a second end extending in opposite directions and are longitudinally stretchable. A range of 2 to 4 elastic bands are used to hold the tubular-shaped members 14 and spherical-shaped members 10 together and keep the shape of the segmented floatation device 22. The bore 38, perpendicular to the flexible elastic bands 30, traverses through the midsection of the tubular-shaped member 14 and allows access to the elastic bands 30 extending through the tubular-shaped member 14. The tubular-shaped members 14 and spherical-shaped members 10 are positioned end-to-end with the elastic bands 30 extending therethrough to form the combination sectioned tubular-shaped member 22. The free end 40 of the segmented floatation device 18 includes the coupler 34 slideably connected to the elastic bands 30. The embodiment illustrated in FIG. 1D consists of 5 tubular-shaped members 14 and 5 spherical-shaped members for a total length of about 62.5 inches; however, any number of tubular-shaped members 14 and spherical-shaped members 10 in any sequence (e.g., sphere to sphere, sphere to member, member to member, etc.) is contemplated.

FIG. 2 illustrates a configuration of the elastic bands 30 in the tubular-shaped member 14, 18, 22 shown in FIGS. 1B-1D. The elastic bands 30 are moveably supported in and in sliding contact with the tubular-shaped member 14 and may be separated within the tubular-shaped member 14. However, this embodiment is not intended to limit the elastic bands 30 to being separated within the tubular-shaped member 14 only to illustrate that this is an embodiment. The elastic bands 30 are moveably supported in and in sliding contact with the tubular-shaped member 14, 18, 22, wherein each of the flexible elastic bands 30 have a first end and a second end extending in opposite directions and are longitudinally stretchable. The couplers 34 are slideably connected to the first and second ends of the elastic bands 30. Cups 44 support the couplers 34 and are recessed in the ends 40 of the tubular-shaped member 14 so that the coupler 34 is subjacent to the end of the member 14. This prevents the coupler 34 from snagging or catching on objects. The cups 44 retain the couplers 34 and preload the elastic bands 30 in tension to support the structure of the member 14. The couplers 34 can be connected to couplers 34 of other members 10, 14, 18, 22 or the elastic bands 30 of other members 10, 14, 18, 22 to form customized structures. The coupler 34 in the side bore 38 is also slideably connected to the elastic band 30 and provides and attachment means for other members 10, 14, 18, and 22. The coupler 34 is supported by the cup 44 in the bore 38 on the side of the tubular-shaped member 14. A cord lock adjuster 48 located in an opposite bore 38 from the side bore 38 with the coupler 34 is slideably connected to the elastic band 30. The elastic band 30 slides through the cord lock adjuster 48 to add additional tension to the elastic bands 30. The cord lock adjuster 48 retains the elastic band 30 in the desired position until a user releases the elastic band 30.

Figure 3:
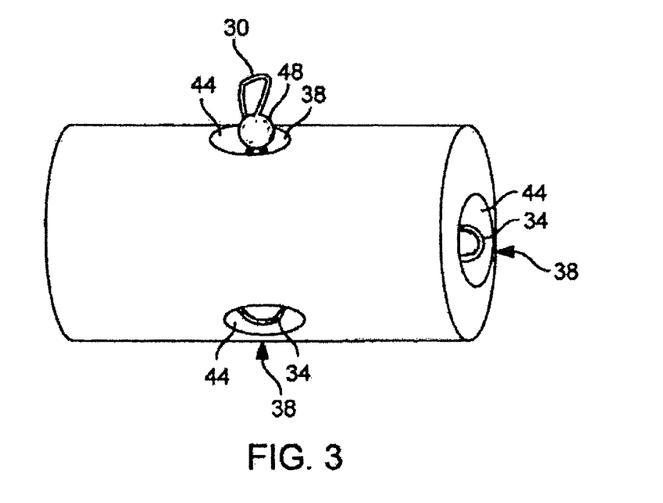
FIG. 3 is a perspective view of the non-segmented member with the cord lock adjuster.

Referring to FIG. 3, the tubular-shaped 14 member includes the plurality of bores 38. Each of the plurality of bores 38 includes the cup 44. At least one of the bores includes the cord lock adjuster 48. The cord lock adjuster 48 retains the elastic band 30 at user-determined positions to adjust the tension in the elastic band 30 and thereby adjust the rigidity of interconnected members 14. The remaining bores 38 may include couplers 34. The coupler 34 attaches the tubular shaped member 14 to other spherical 10 or tubular-shaped members 14, 18, 22. The cups 44 retain the couplers 34 and cord lock adjuster 48.

Figure 4:
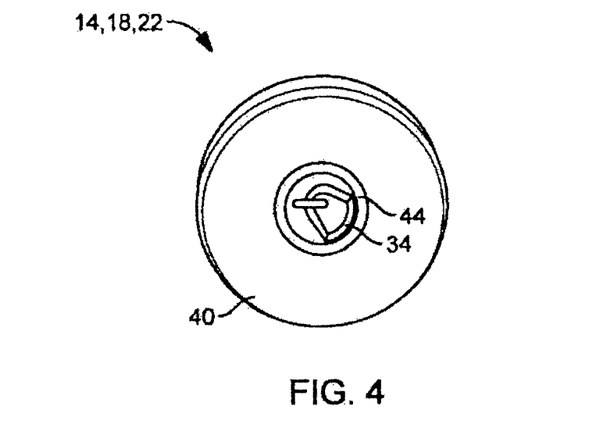
FIG. 4 is a detail view of the coupler in the port on the end of the member.

FIG. 4 is a detailed illustration of the coupler 34 on the end 40 of the tubular-shaped member 14, 18, 22. The end 40 of the tubular-shaped member 14, 18, 22 includes the bore 38 with the cup 44 to retain the coupler 34. The coupler 34 is slideably connected to the elastic bands 30. The coupler 34 may be one of a clip (as illustrated), a hook, a loop, or any other releasable fastening device.

Figure 5:
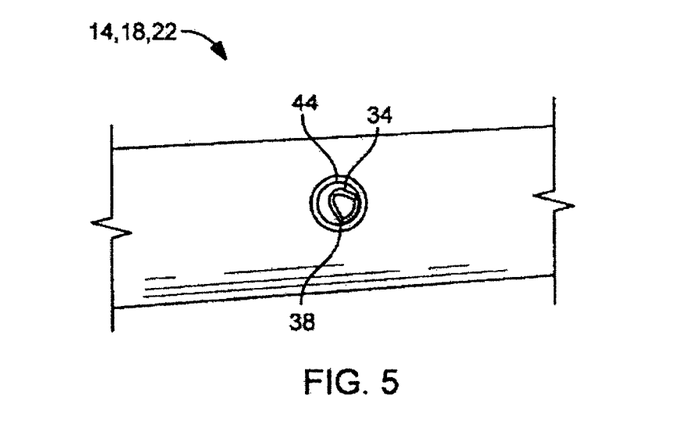
FIG. 5 is a detail view of the coupler in the port on the side of the member.

A detailed illustration of the coupler 34 on the side of the tubular-shaped member 14, 18, 22 is illustrated in FIG. 5. The side of the tubular-shaped member 14, 18, 22 includes the bore 38 with the cup 44 to retain the coupler 34. The coupler 34 is slideably connected to the elastic bands 30. The side of the tubular-shaped member 14, 18, 22 does not need a coupler 34 or the cup 44, but may be an open bore 38 simply providing access to the elastic bands 30 in the center of the tubular-shaped member 14, 18, 22 (Illustrated in FIGS. 1B-1D).

FIGS. 6A-6D illustrates four embodiments of connector members. An L-shaped connector 52 (FIG. 6A) includes elongated portions extending perpendicular from each other in an L-shape or 90° included angle and connects with a plurality of spherical-shaped members 10 and tubular-shaped members 14, 18, 22 on a plurality of its faces. As shown in the figure, the L-shaped connector 52 is connected to two tubular-shaped members 14, 18, 22. Each end 56 of the L-shaped connector 52 is configured as a male portion fitting within the female portion of the cup 44 on the end 40 of the tubular-shaped member 14, 18, 22. The end 56 includes a coupler 60 that may be an eye screw (as illustrated here) or any other coupler. The coupler 34 on the tubular-shaped member 14, 18, 22 attaches to the eye screw 60 on the L-shaped connector 52 to hold the connector 52 in place.

A tri-corner connector 64 (FIG. 6B) includes three elongated portions extending away from each other and allows for a plurality of spherical-shaped members 10 and tubular-shaped members 14, 18, 22 to connect to a plurality of its faces. The length of each elongated portion should allow various sized tubular-shaped members 14, 18, 22 and spherical-shaped members 10 to be attached thereto without interference. Each face on each of the connector members 68, 72, 76 contains the cup 44 recessed into the end 40 and the coupler 60 for connection with the spherical-shaped members 10 and the tubular-shaped members 14, 18, 22.

A T-shaped connector 80 (FIG. 6C) includes three elongated portions forming a T-shape and allows for a plurality of spherical-shaped members 10 and tubular-shaped members 14, 18, 22 to connect to a plurality of its faces. The ends 40 of the T-shaped connector 80 contain the same elements as the ends of the tri-corner connector 64.

A cross-shaped connector 84 (FIG. 6D) includes four elongated portions extending away from each other and allowing for a plurality of spherical-shaped members 10 and tubular-shaped members 14, 18, 22 to connect to a plurality of its faces. Each end 40 of the connector 84 contains the same elements as the tri-corner connector 64 and the T-shaped connector 80. The connectors 52, 64, 80, 84 may contain any number of elongated portions and may allow any number of a plurality of spherical-shaped members 10 and tubular-shaped members 14, 18, 22 to connect to a plurality of its faces.

Figure 6A:
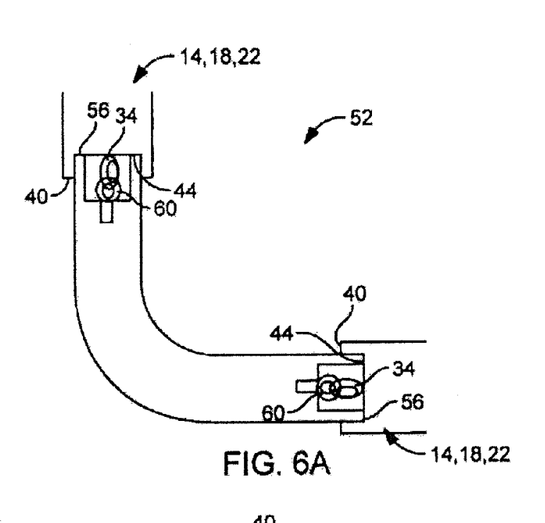
FIG. 6A-6D are perspective views of coupler members including an L-shaped 90° coupler attached to the couplers in the ports on the ends of the members, a T-shaped coupler, a cross coupler, and a tri-corner coupler.
Figure 6B:
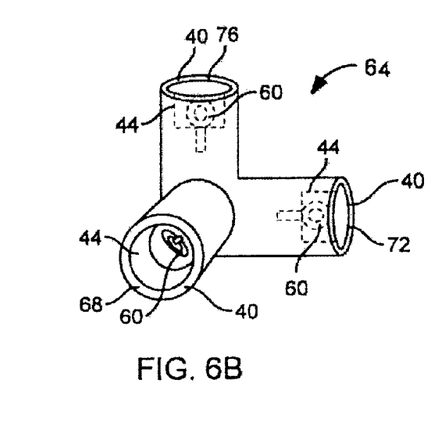
Figure 6C:
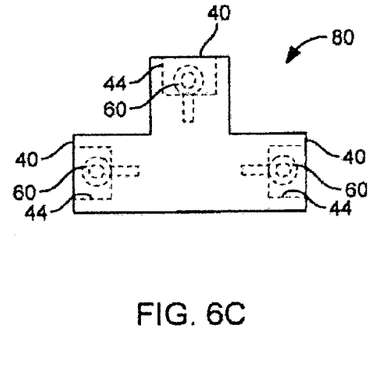
Figure 6D:
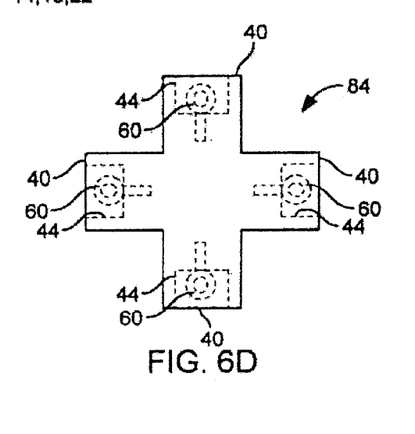

The embodiments in FIGS. 6A-6D are examples of some connectors that may be used but are not limiting to the disclosure. While a 90° included angle is generally shown in FIGS. 6A, 6C and 6D, one skilled in the art will recognize that the connector could be configured with other included angles such as 45°, 120° or 180°.

Figure 7A:
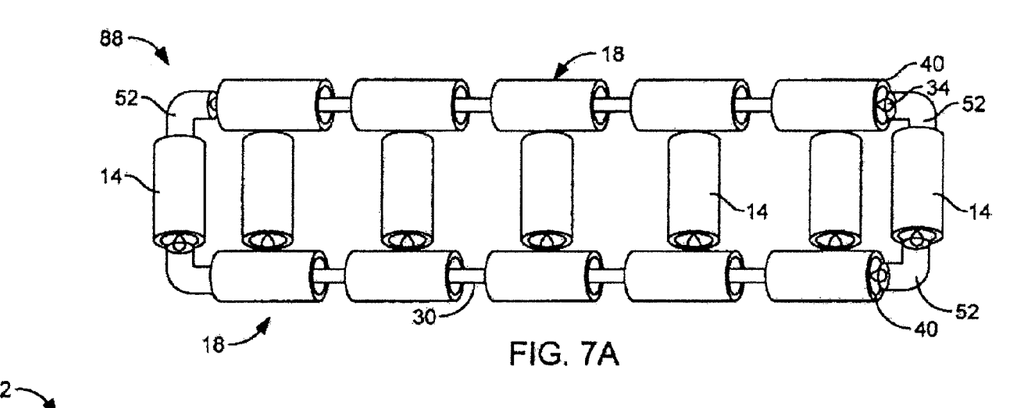
FIGS. 7A-7C illustrate connection options of members with same and different diameter members.
Figure 7B:
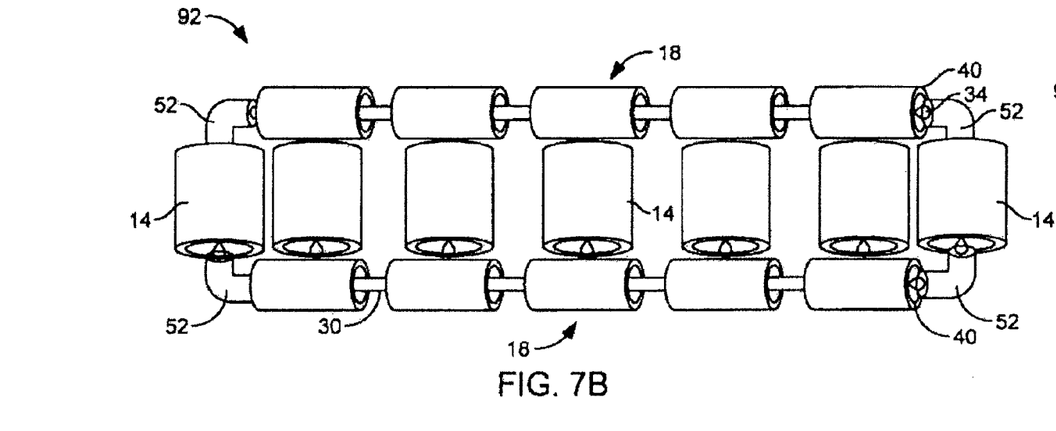
Figure 7C:
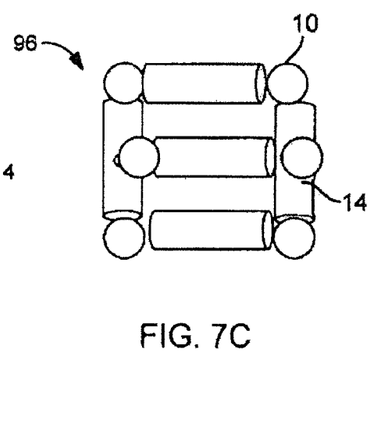

Referencing FIGS. 7A-7C and 8A-8C, all of the embodiments of the spherical-shaped members 10 and the tubular-shaped members 14, 18, 22 can be utilized together to construct a variety of structures. The segmented recreational device can be constructed with spherical-shaped members 10 and tubular-shaped members 14, 18, 22 of a plurality of diameters and a plurality of colors (as seen in FIGS. 8D and 8E). The couplers 34 on the ends of the spherical-shaped member 10 and the tubular-shaped members 14, 18, 22 are adapted to be releasably connected together to form elongated segmented recreational devices. The couplers 34 also hook to the elastic bands 30 through the bores 38 cut through the tubular-shaped members 14, 18, 22. FIGS. 7A-7C illustrate a ladder construction 88, 92, 96 made from sectioned tubular-shaped members 18 with small diameter tubular-shaped members 14 (FIG. 7A), a combination of sectioned tubular-shaped members 18 with large diameter tubular-shaped members 14 (FIG. 7B), and tubular-shaped members 14 with spherical-shaped members 10 (FIG. 7C). Couplers 34 connect the 10-inch tubular-shaped members 14 to the elastic bands 30 of the sectioned tubular-shaped members 18.

Figures 8A, 8B, 8C, 8D, 8E:
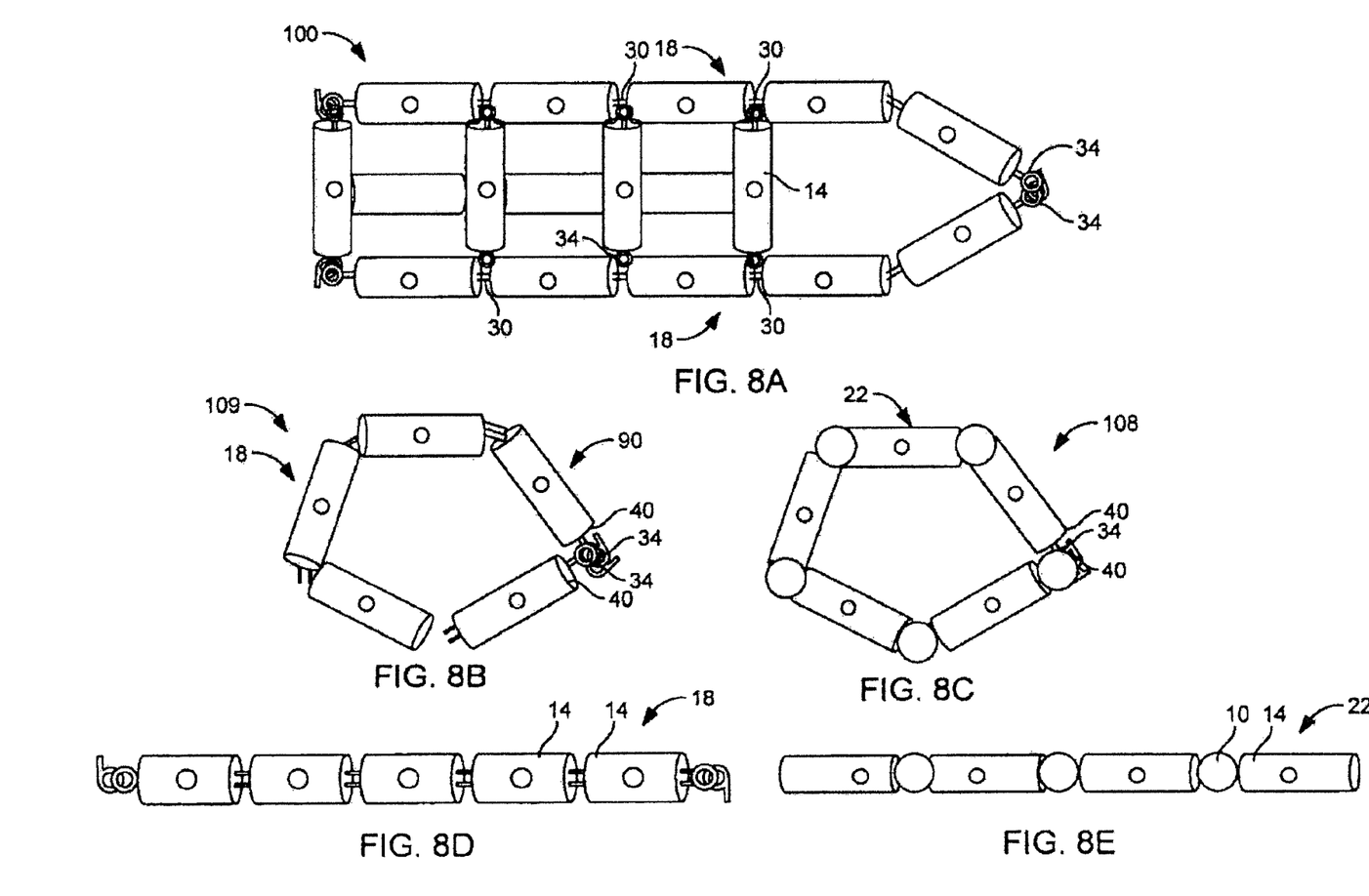
FIGS. 8A-8E illustrate three embodiments of configuration options and two embodiments of team color options.

FIGS. 8A-8E illustrate different embodiments of construction with segmented recreational devices. A personal float 100 is illustrated in FIG. 8A using two sectioned tubular-shaped members 18 with their couplers 34 connected together on one end. The couplers of seven 10-inch tubular-shaped members 14 are connected throughout the sectioned tubular-shaped members 18 along their elastic bands 30 with one 10-inch tubular-shaped member 14 connected by its couplers 34 to the couplers 34 of the sectioned tubular-shaped members 18. The couplers 34 of the spherical-shaped members 10 and tubular-shaped members 14, 18, 22 can be connected to another spherical-shaped member 10 or tubular-shaped member 14, 18, 22 at any of its couplers 34, elastic bands 30 at the bore 38, and elastic bands 30 between the tubular-shaped members 14, 18, 22. FIG. 8B illustrates a ring 104 including one sectioned tubular-shaped member 18 with the couplers 34 at each of its ends 40 connected together. FIG. 8C illustrates a combination ring 108 including one sectioned combination tubular-shaped member 22 with the couplers 34 at each of its ends 40 connected together.

FIGS. 8D and 8E illustrate examples of several embodiments of the segmented recreational device. The sectioned tubular-shaped member 18 with large diameter tubular-shaped members 14 is shown with contrasting colors. A small diameter sectioned combination tubular-shaped member 22, 52.5 inches in length, is also shown with contrasting colors. FIGS. 8D and 8E are not intended to limit the scope of this disclosure, but to illustrate some examples of the various structures that can be constructed from the segmented recreational device.

Figure 9A:
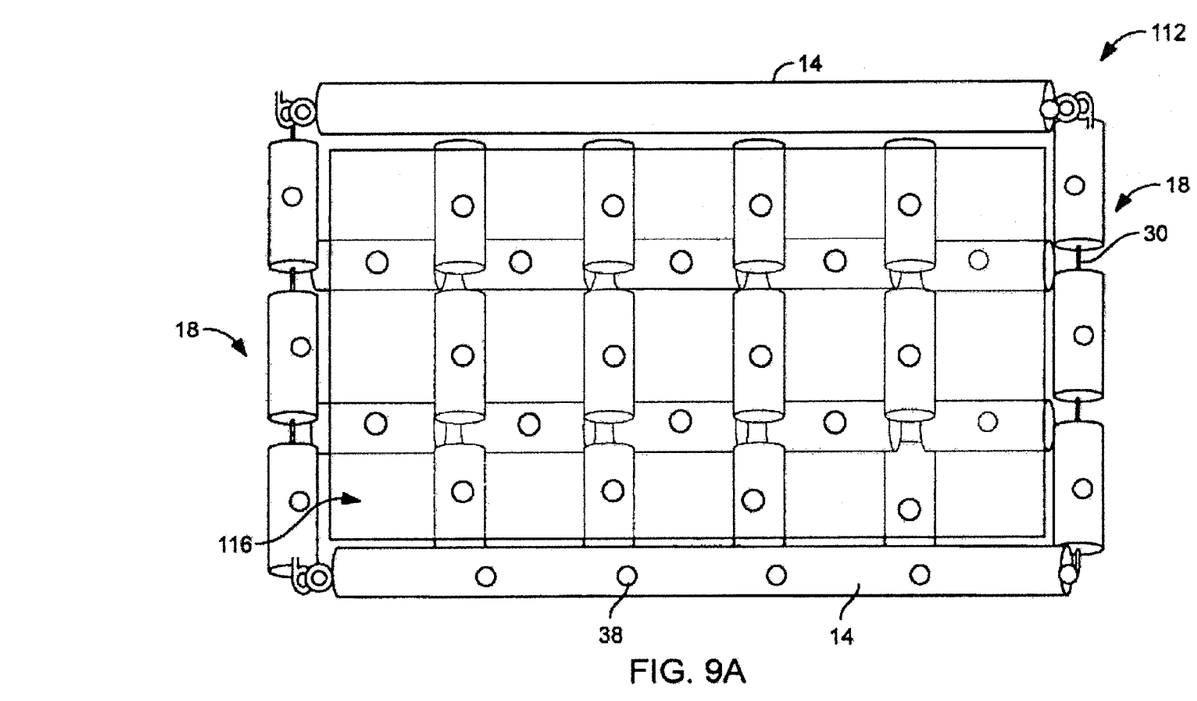
FIG. 9A and FIG. 9B are perspective views of an embodiment incorporating a mat and an embodiment incorporating a flexible member and a sleeve.

The embodiment illustrated in FIG. 9A includes a plurality of sectioned tubular-shaped members 18 and tubular-shaped members 14 connected together to form a woven-rectangle 112. A mat 116 is included in this embodiment and is detachably connected to the tubular-shaped members 14, 18 at the bores 38 or the elastic bands 30 between the tubular-shaped members 14, 18. The mat 116 is constructed of a flexible sheet material and provides extra structure to the construction.

Figure 9B:
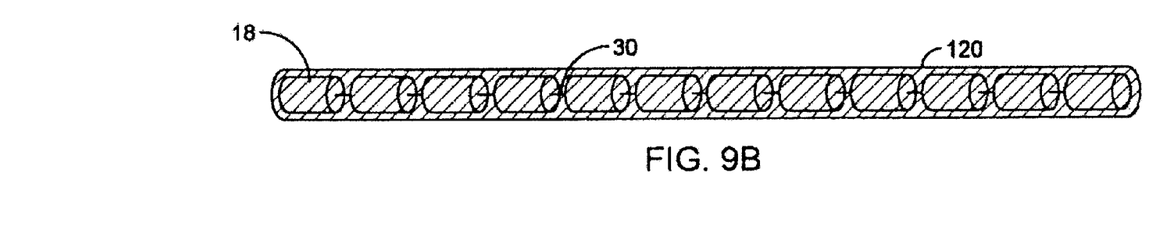

Referring to FIG. 9B, another embodiment is disclosed which includes a sleeve 120 disposed over the sectioned tubular-shaped member 18. The sleeve 120 is constructed of a flexible stretchable sheet material such as a spandex or elastic fabric and provides additional support for the structure and enhanced visual appeal.

It is envisioned that the segmented recreational devices could be packaged as a kit including a plurality of different spherical-shaped members 10 and tubular-shaped members 14, 18, 22 which can be detachably connected to form a plurality of shapes and structures. Accessories such as a low voltage light string, a cup holder, a mesh mat or other accessories may also be included in the kit for attachment to the segmented recreational device for added functionality and/or visual appeal.

It is further envisioned that the segmented recreational devices have utility as pliable building blocks suitable for use away from an aquatic environment such as a pool, lake or ocean. In particular, the interchangeable design of these devices and the limitless way in which they can be assembled allow the product to be used as pliable building blocks in a manner similar to conventional building blocks. For example, the devices may be interconnected to make bumpers, arches, tunnels, tents, letters, numbers, figurines, goals, hoops, playscapes, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A member for use in a segmented recreational device comprising:
    a body portion having an outer surface;
    an elastic band moveably supported within said body portion, said elastic band having a first end and a second end extending in opposite directions and being longitudinally stretchable;
    a first coupler connected to said first end of said elastic band adjacent said first end thereof;
    a second coupler connected to said second end of said elastic band adjacent said second end thereof;
    a first cup recessed into said body portion;
    a second cup recessed into said body portion opposite to said first cup;
    wherein said first and second cups support said first and second couplers in a position subjacent to said outer surface of said body portion; and
    wherein said first and second cups retain said first and second couplers such that said elastic band is preloaded in tension within said body portion.

2. The member of claim 1, further comprising said body portion having a bore in a side generally perpendicular to said elastic band to provide lateral access to said elastic band between the first and second recesed cups.

3. The member of claim 2, further comprising a cord lock adjuster at least partially disposed in said bore and retaining at least a portion of said elastic band in a position for adjusting said preloaded tension on the elastic band.

4. The member of claim 3, further comprising a third cup recessed into said bore in said side of said body portion.

5. The member of claim 2, further comprising a third coupler connected to said elastic band between said first and second couplers and adjacent said side of said body portion, said coupler being at least partially disposed in said bore.

6. The member of claim 5, wherein said third cup is recessed in said side of said body portion.

7. The member of claim 1, wherein said body portion is an elongated tubular-shaped element having a first end and a second end.

8. The member of claim 7 in combination with a nodal member comprising:
- a spherical-shaped body having an outer surface;
  - a first recess formed into said outer surface and having a first coupler at least partially disposed therein;
  - a second recess formed into said outer surface opposite said first cup and having a second coupler at least partially disposed therein;
  - wherein at least one of said first and said second couplers of said tubular shaped member adapted to be releasably fastened with at least one of said first and said second couplers of said nodal member to form a segmented recreational device.

9. A tubular-shaped member for use in a segmented recreational device comprising:
- an elongated body portion having a first end, a second end and a bore extending through a side wall thereof from a first side to a second side;
- an elastic band supported within said elongated body portion, said elastic band having a first end and a second end extending in opposite directions and being longitudinally stretchable;
- a first cup recessed in said first end of said elongated body portion;
- a first coupler connected to said first end of said elastic band and retained in said first cup subjacent said first end of said elongated body portion;
- a second cup recessed in said second end of said elongated body portion;
- a second coupler connected to said second end of said elastic band and retained in said second cup subjacent said second end of said elongated body portion, said first and second cups retain said first and second couplers being retained in said first and second cups such that said elastic band is preloaded in tension within said elongated body portion;
- a third cup recessed into said side bore on said first side of said elongated body portion;
- a third coupler connected to said elastic band intermediate said first and second ends and at least partially retained in said third cup; and
- a cord lock adjuster disposed in said bore opposite said third cup and retaining retains at least a portion of said elastic band in a position for adjusting said preloaded tension on said elastic band.

10. A kit for constructing a recreational device of the type having a plurality of components, each of said plurality of components comprising:
- a body portion;
  - an elastic band supported in said body portion, said elastic band having a first end and a second end extending in opposite directions and being longitudinally stretchable;
  - a first coupler connected to said first end of said elastic band;
  - a first cup recessed in said body portion and supporting said first coupler in a subjacent position with respect to an outer surface of body member while providing access to said first coupler;
  - a second coupler connected to said second end of said elastic band;
  - a second cup recessed in said body portion and supporting said second coupler in a subjacent position with respect to said outer surface while providing access to said second coupler;
  - wherein said first and second cups in combination with said first and second couplers retain a preloaded tension in said elastic band; and
  - wherein said plurality of components are adapted to be releasably coupled together for forming a segmented recreational device.

11. The kit of claim 10 wherein each of said plurality of components further comprises a cord lock adjuster retaining said elastic band in a position for adjusting said preloaded tension on the elastic band.

12. The kit of claim 10 wherein said plurality of components comprises:
- a first plurality of tubular-shaped members, each of said first plurality of tubular-shaped members having a tubular body portion with a first diameter;
- a second plurality of tubular-shaped members, each of said second plurality of tubular-shaped members having a tubular body portion with a second diameter which is greater than said first diameter; and
- wherein said first and second plurality of tubular-shaped members are adapted to be releasably coupled together to form said segmented recreation device.

13. The kit of claim 10 wherein said plurality of components comprises:
- a first plurality of tubular-shaped members, each of said first plurality of tubular-shaped members having tubular body portion with a first length;
- a second plurality of tubular-shaped members, each of said second plurality of tubular-shaped members having a tubular body portion with a second length which is greater than said first length; and
- wherein said first and second plurality of tubular-shaped members are adapted to be releasably coupled together to form said segmented recreation device.

14. The kit of claim 10 wherein said plurality of components further comprises:
- a spherical-shaped body having an exterior surface;
- a first cup recessed into said exterior surface, said first cup having a first coupler therein;
- a second cup recessed into said exterior surface opposite said first cup, said second cup having a second coupler therein;
- wherein said spherical-shaped body interconnects said first component with said second component to form the segmented recreational device.

15. The kit of claim 14 wherein said plurality of components comprises:
- a first plurality of spherical-shaped members, each of said first plurality of spherical-shaped members having a first diameter;
- a second plurality of spherical-shaped members, each of said second plurality of spherical-shaped members having a second diameter which is greater than said first diameter; and
- wherein said first and second plurality of spherical-shaped members are configured to be releasably coupled together to form said segmented recreation device.

16. The kit of claim 10 further comprising a connector including a first leg having a first end configured to fit within said first cup of said first component and a second leg having a second end configured to fit within said second cup of said second component, wherein said first and second legs are oriented with an included angle therebetween to fixedly position said first component relative to said second component.

17. The kit of claim 16 wherein an included angle is selected from the group consisting of 45°, 60°, 90°, 120°, and 180°.

18. The kit of claim 10 wherein said plurality of components comprises:
- a first plurality of tubular-shaped members, each of said first plurality of tubular-shaped members having a first color;
- a second plurality of tubular-shaped members, each of said second plurality of tubular-shaped members having a second color which is different than said first color; and
- wherein said first and second plurality of tubular-shaped members are configured to be releasably coupled together to form said segmented recreation device.

19. The kit of claim 10 further comprising a rectangular mat having a plurality of couplers coupled thereto, wherein said plurality of components are configured to be releasably coupled to said rectangular mat to form said segmented recreation device.

20. The kit of claim 10 wherein each of said plurality of components further comprises a stretchable sheet material covering said tubular-shaped member.

21. The member of claim 1 further comprising a cord lock adjuster retaining said elastic band in a position for adjusting said preloaded tension on the elastic band.

* * * * *